United States Patent
Youngblood

(10) Patent No.: US 11,771,005 B2
(45) Date of Patent: Oct. 3, 2023

(54) CUTTER IMPLEMENT WITH CURTAIN

(71) Applicant: DEERE & COMPANY, Moline, IL (US)

(72) Inventor: Kyle R. Youngblood, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 414 days.

(21) Appl. No.: 17/070,395

(22) Filed: Oct. 14, 2020

(65) Prior Publication Data

US 2022/0110261 A1 Apr. 14, 2022

(51) Int. Cl.
*A01D 57/01* (2006.01)
*A01D 57/22* (2006.01)

(52) U.S. Cl.
CPC ............ *A01D 57/01* (2013.01); *A01D 57/22* (2013.01)

(58) Field of Classification Search
CPC ......... A01D 43/10; A01D 57/22; A01D 57/01
See application file for complete search history.

(56) References Cited

U.S. PATENT DOCUMENTS

| | | | | |
|---|---|---|---|---|
| 3,027,701 A | * | 4/1962 | Campbell | A01D 75/20 15/82 |
| 3,306,015 A | | 2/1967 | Myers | |
| 3,940,910 A | * | 3/1976 | d'Acremont | A01D 43/10 56/14.4 |
| 4,388,961 A | * | 6/1983 | Schaefer | E06B 3/80 160/332 |
| 4,499,711 A | * | 2/1985 | McLean | A01D 43/10 56/180 |
| 4,539,798 A | * | 9/1985 | Klinner | A01F 12/18 56/364 |

(Continued)

FOREIGN PATENT DOCUMENTS

| | | |
|---|---|---|
| CA | 2272198 A1 | 11/2000 |
| DE | 19921762 A1 * | 11/1999 ............ A01D 75/20 |

(Continued)

OTHER PUBLICATIONS

Extended European Search Report and Written Opinion issued in European Patent Application No. 21200670.4, dated Mar. 4, 2022, in 11 pages.

(Continued)

*Primary Examiner* — Alicia Torres
*Assistant Examiner* — Julia I Bartlett-Sloan

(57) ABSTRACT

The cutter implement may include a housing, a cutter, and a curtain. The housing has a forward end for engaging the crop material when moving in a direction of operation. The housing at least partially defines a cutting region disposed at the forward end. The cutter is coupled to the housing and can cut the crop material in the cutting region. The curtain is coupled to the forward end of the housing and is positioned forward of the cutter relative to the direction of operation for engaging and leaning the crop material upstream of the cutter. The curtain includes a stiffness control feature operable to control a vertical stiffness of the curtain to provide a variable vertical stiffness that increases with an increase in a bend angle of the curtain rearward relative to the direction of operation.

17 Claims, 13 Drawing Sheets

(56) References Cited

U.S. PATENT DOCUMENTS

| | | | |
|---|---|---|---|
| 4,729,212 A | * | 3/1988 | Rabitsch ................ A01D 41/14 56/119 |
| 7,980,049 B1 | | 7/2011 | Branham et al. |
| 2009/0249763 A1 | | 10/2009 | Diederich, Jr. et al. |
| 2009/0272090 A1 | | 11/2009 | Blakeslee et al. |

FOREIGN PATENT DOCUMENTS

| | | | |
|---|---|---|---|
| GB | 2005523 A | | 4/1979 |
| WO | WO-9949720 A1 | * | 10/1999 ............. A01D 41/06 |

OTHER PUBLICATIONS

Extended European Search Report issued in European Patent Application No. 21200670.4, dated Nov. 4, 2022, in 10 pages.

* cited by examiner

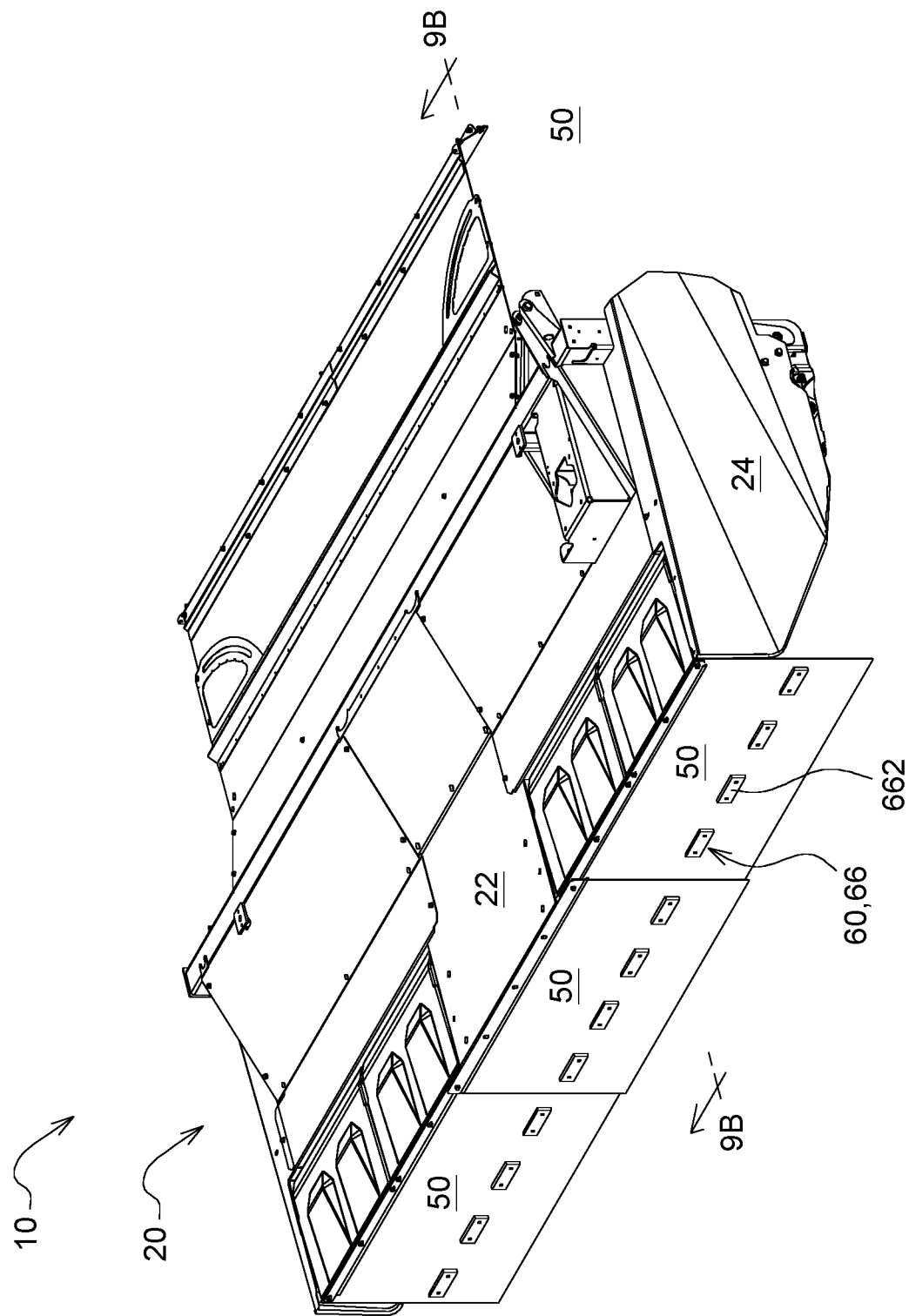

CUTTER IMPLEMENT WITH CURTAIN

RELATED APPLICATIONS

N/A.

FIELD OF THE DISCLOSURE

The present disclosure relates generally to a cutter implement for cutting crop material.

BACKGROUND OF THE DISCLOSURE

Forages, such as grasses, legumes, maize, and other crop residues, are commonly cut by a cutter implement, such as but not limited to, a mower or mower-conditioner. The types of crops harvested vary widely from short crops that are compliant and flexible to tall crops that are relatively ridged and inflexible. As a general rule however, taller crops are typically more stiff/rigid than short crops so as to stand steadily on the ground. For some crops, it may be preferred for the cutter implement to cut the crop when the crop has a slight lean forward relative to the direction of travel of the cutter implement.

SUMMARY OF THE DISCLOSURE

According to an aspect of the present disclosure, a cutter implement for cutting crop material is provided. The cutter implement may include a housing, a cutter, and a curtain. The housing has a forward end for engaging the crop material when moving in a direction of operation. The housing at least partially defines a cutting region disposed at the forward end. The cutter is coupled to the housing and can cut the crop material in the cutting region. The curtain is coupled to the forward end of the housing and is positioned forward of the cutter relative to the direction of operation for engaging and leaning the crop material upstream of the cutter. The curtain includes a stiffness control feature operable to control a vertical stiffness of the curtain to provide a variable vertical stiffness that increases with an increase in a bend angle of the curtain rearward relative to the direction of operation.

A curtain apparatus for a cutter implement is provided. The curtain apparatus includes a curtain operable to be coupled to the cutter implement. The curtain includes a stiffness control feature operable to control a vertical stiffness of the curtain to provide a variable vertical stiffness that increases with an increase in a bend angle of the curtain rearward relative to a direction of operation.

BRIEF DESCRIPTION OF THE DRAWINGS

FIG. 9A. is a schematic perspective view of the sixth implementation of a stiffness control feature of a curtain.

DETAILED DESCRIPTION OF THE DRAWINGS

Figure 1:
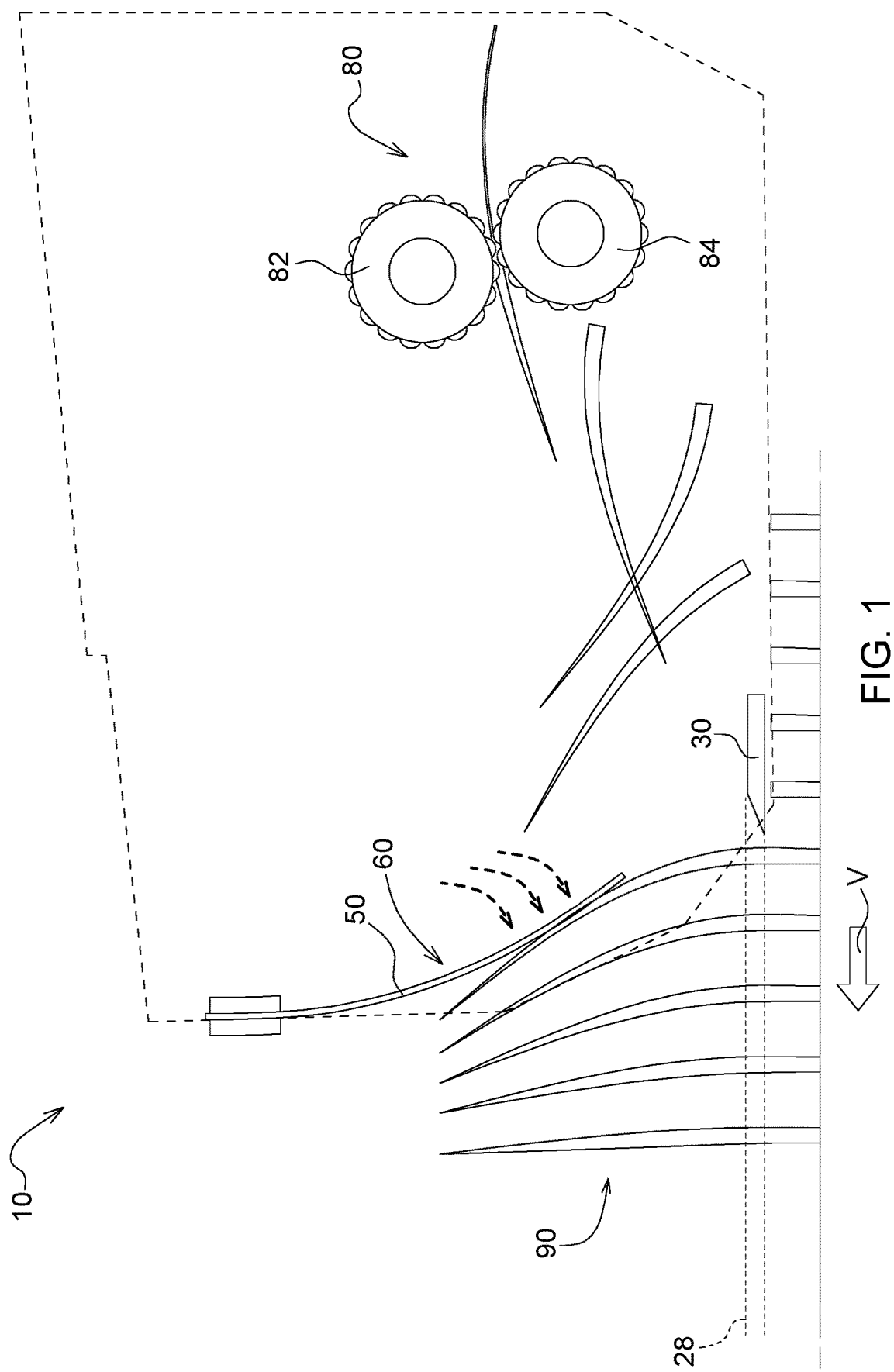
FIG. 1 is a diagrammatic view illustrating the crop leaning forward slightly for a cutting implement to cut.
Figure 2A:
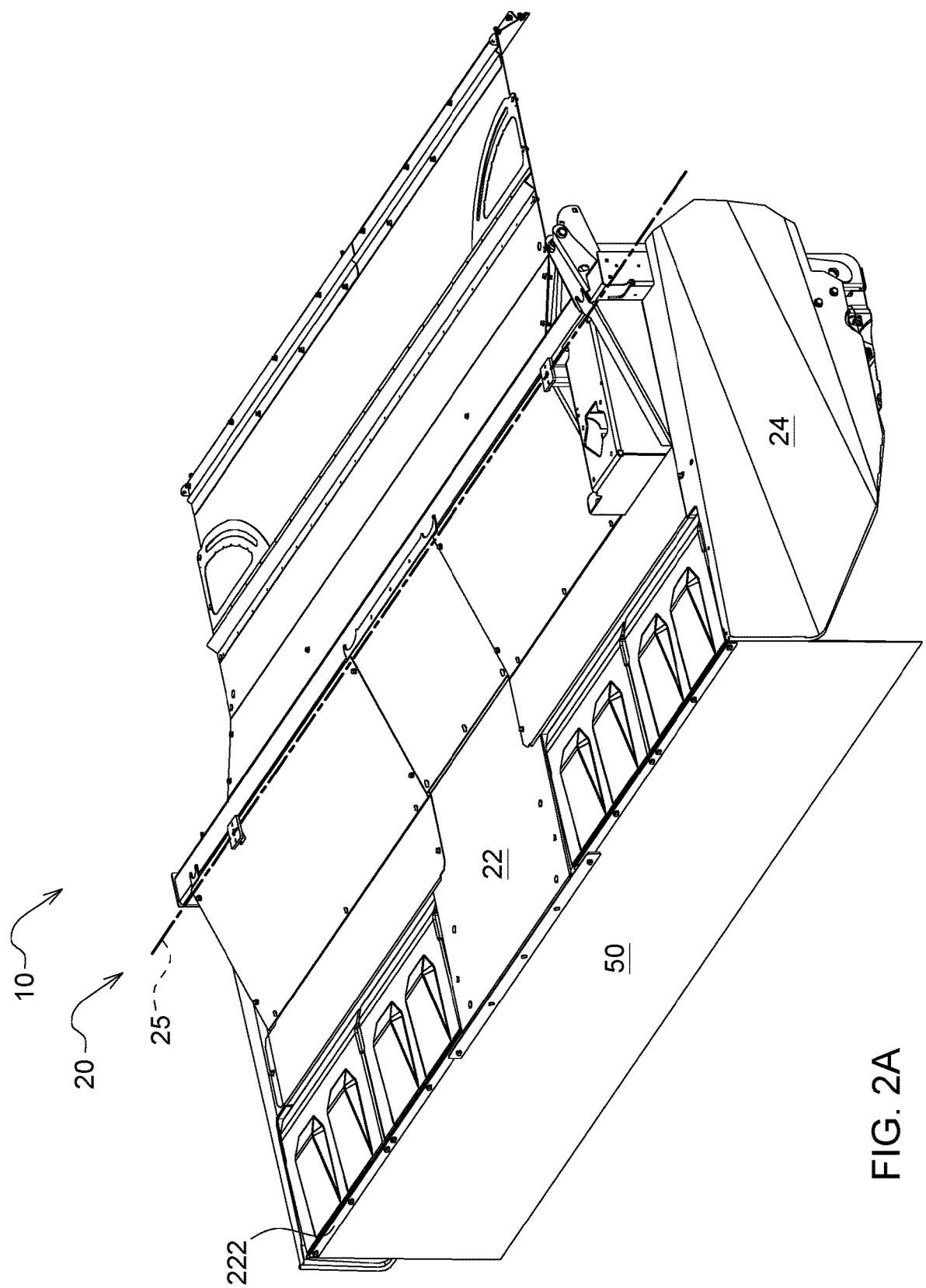
FIG. 2A is a schematic perspective view of a cutter implement including a curtain having one section.
Figure 2B:
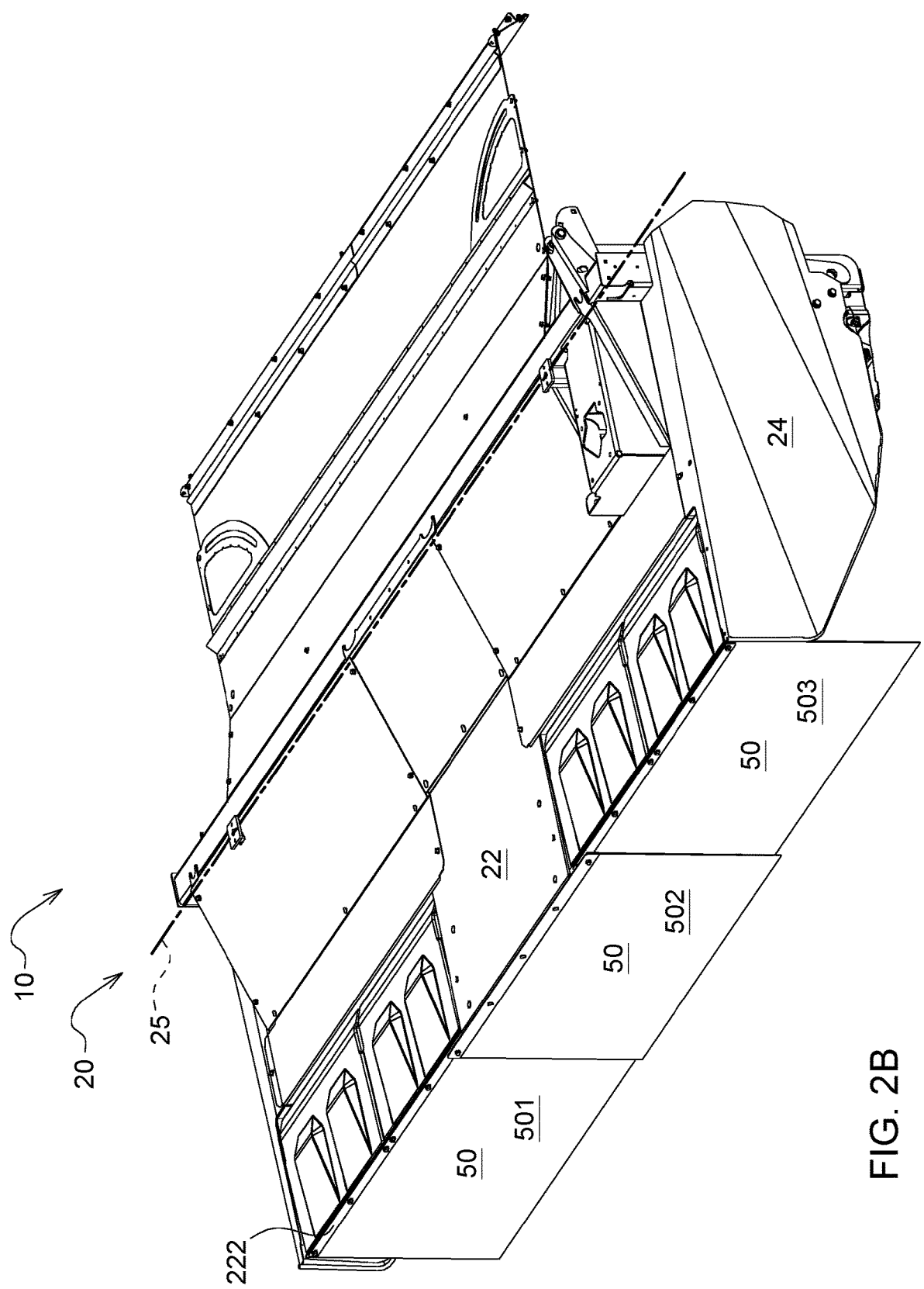
FIG. 2B is a schematic perspective view of a cutter implement including a curtain have multiple sections.

Referring to FIG. 1, a cutter implement 10 include a cutter 30 extending in a forward direction relative to the direction of the operation V, which is the travel direction. For clarity, a housing 20 of the cutter implement 10 is omitted in FIG. 1 but is shown in FIGS. 2A and 2B. A cutting region 28 is defined in front of the cutter 30. Optionally, a crop processor 80 is positioned rearward of the cutter relative to the direction of operation (travel) and operable to condition cut crop material 90. The crop processor 80 in one implementation includes a first conditioning roll 82 and a second conditioning roll 84 engaging with each other to condition the crop material 90. However, it should be appreciated that the crop processor 80 may be implemented in another configuration not shown or described herein that is capable of processing cut crop as understood by those skilled in the art. The cutter implement 10 may include, but is not limited to, a mower and a mower-conditioner. The mower and/or mower conditioner may be drawn by a vehicle, such as but not limited to a tractor or other similar vehicle, or may be a self-propelled implement having motive power, steering systems, control systems, etc.

Leaning the crop 90 forward may provide several benefits for crop cutting and crop conditioning process. For example, it may allow the base end of the stems to be fed into the first conditioning roll 82 and the second conditioning roll 84 as shown in FIG. 1. Feeding the crop (material) 90 into the crop processor 80 in this manner has shown to improve cutting performance by minimizing re-cutting at the cutter 30 and it improves cut height uniformity. However, the degree to which the crops 90 are flexed forward greatly affects how much the performance can be improved. In fact, if the crop 90 is over-flexed it may hinder cutting performance.

Therefore, to achieve the improvement in cutting and conditioning performance, the crop 90 may be flexed forward "slightly" so that the stem remains intact and erect but not "over-bent" such that the stem is kinked/yielded, causing the crop to permanently tip or lay on the ground prior to being severed. In general, taller crops are typically more stiff/rigid than short crops. Therefore, a bending force required to bend rigid taller crops forward may need to be stronger than the bending force required to bend shorter more compliant crops forward. The present disclosure includes a cutter implement and a cutter apparatus, which have a stiffness control feature for a curtain operable to control a vertical stiffness of the curtain to determine the force applied to the crop. The vertical stiffness of the curtain is directly related to the resistance against bending of the curtain resulting from the pushing/reaction of the crop material 90 acting on the curtain 50. As shown in FIGS. 2A and 2B, the cutter implement 10 may include a housing 20, the cutter 30, and a curtain 50. The housing 20 includes an upper frame portion 22, a first lateral frame portion 24, and a second lateral frame portion 26. The first lateral frame portion 24 and the second lateral frame portion 26 are spaced apart from each other and disposed on opposing lateral sides of the housing 20 relative to a central longitudinal axis 25 of the housing 20. The housing 20 also has a forward end 222, included by the upper frame portion 22 in one implementation, for engaging the crop material 90 when moving in a direction of operation V. The housing 20 at least partially defines the cutting region 28 disposed at or near the forward end 222.

The cutter 30, as shown in FIGS. 2A and 2B, is coupled to the housing 20 and is operable to cut the crop material 90 in the cutting region 28. In one implementation, the cutter 30 is configured as a cutter-bar extending laterally transverse relative to the central longitudinal axis 25 of the housing 20, across a width of the cutter implement 10.

The curtain 50 is coupled to the forward end 222 of the housing 20 and is positioned forward of the cutter 30 relative to the direction of operation V for engaging and leaning the crop material 90 upstream of the cutter 30, as shown in FIGS. 2A and 2B. The curtain 50 at least partially defines the cutting region 28. In one implementation, the curtain 50 has one section coupled laterally to the forward end 222, as shown in FIG. 2A. In another implementation, the curtain 50 may include multiple sections coupled laterally to the forward end 222. As shown in FIGS. 2A and 2B, the curtain 50 may include three sections 501, 502, 503. The middle section 502 has an offset to the other two adjacent sections 501 and 503 in the direction of operation V. The number of the section(s) is only for explanatory purpose, and it can be varied depending on the particular need. The number of the sections being equal to or more than two may allow the operator to replace part of the curtain 50 section by section. The implementations of the curtain 50 described in this disclosure may be applied to single section or more than one section of the curtain 50. The curtain 50 is moveable in a rearward direction relative to the direction of operation V. When the cutter implement 10 moves in the direction of operation V, the curtain 50 contacts the crop 90 and may be moved in the rearward direction due to the stiffness of the crop 90. The crop 90 may be simultaneously flexed forward due to the force applied from the curtain 50. The weight, material, shape, and/or other characteristic of the curtain 50 affect the vertical stiffness of the curtain, and may bias the curtain 50 toward its original position, which provides a resistance of the curtain 50 against rearward movement after the curtain 50 contacts the crop 90.

Figure 3A:
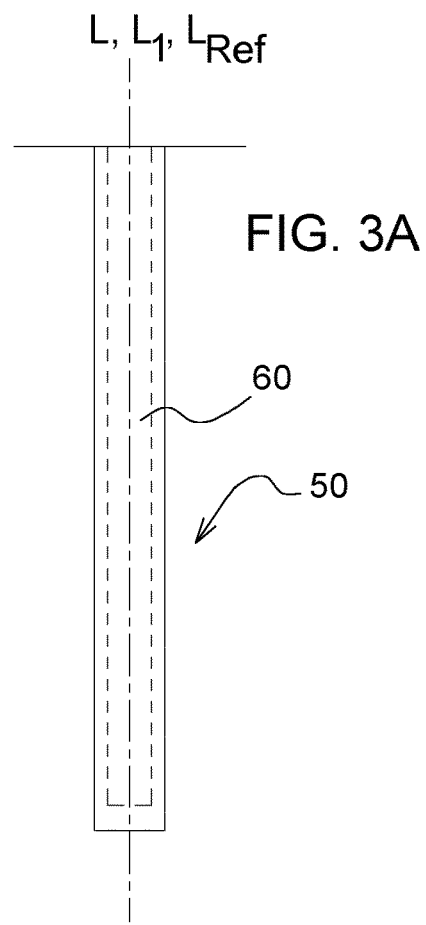
FIG. 3A is a schematic side view of a curtain before it contacts crop material.
Figure 3B:
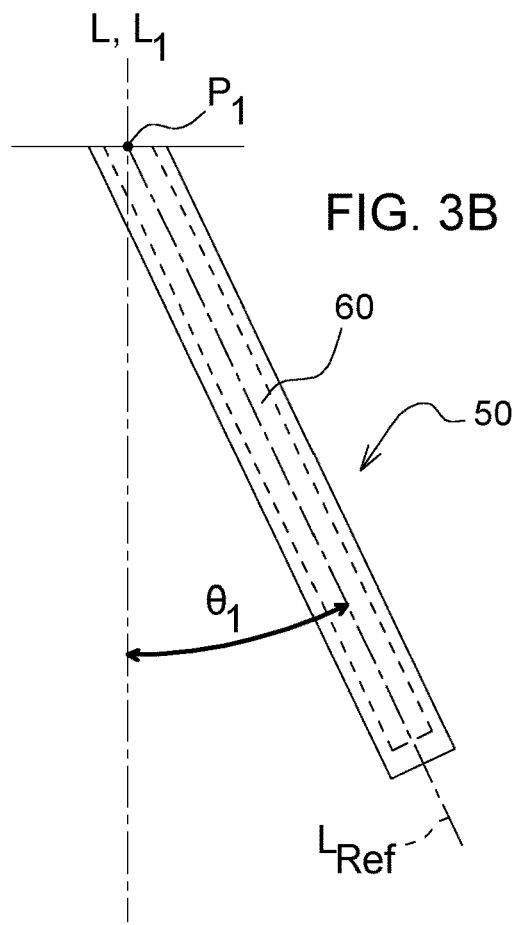
FIG. 3B is a schematic side view of a curtain having a bend angle at the top of the curtain when the curtain contacts crop material.
Figure 3C:
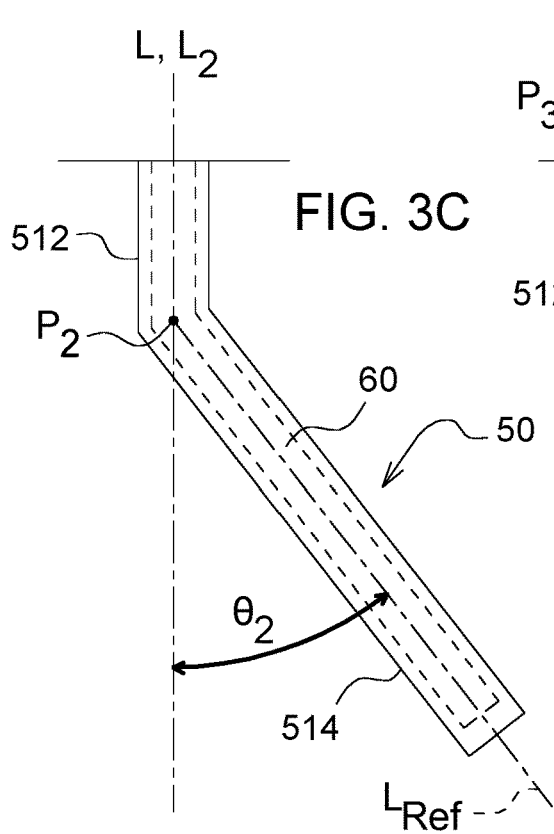
FIG. 3C is a schematic side view of a curtain having a bend angle between the top and bottom of the curtain when the curtain contacts crop material.
Figure 3D:
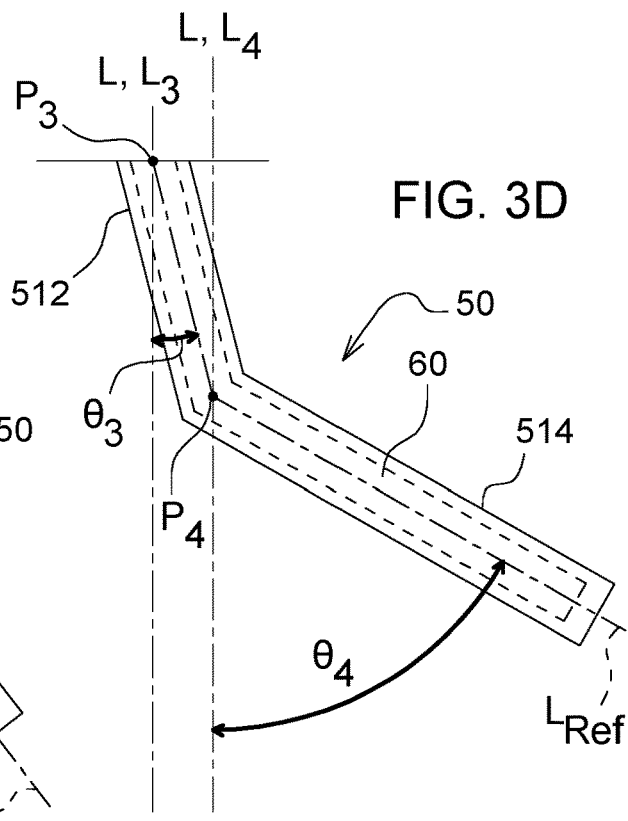
FIG. 3D is a schematic side view of a curtain having two bend angles on the top and between the top and bottom of the curtain when the curtain contacts crop material.

Referring to FIGS. 3A-3D the curtain 50 includes a stiffness control feature 60 operable to control the vertical stiffness of the curtain 50. The stiffness control feature 60 is operable to provide a variable vertical stiffness that increases with an increase in a bend angle θ of the curtain 50 rearward relative to the direction of operation V. The vertical stiffness of the curtain 50 is directly related to the resistance against bending resulting from the pushing of the crop material 90 acting on the curtain 50. FIGS. 3B-3D illustrate the bend angle θ, can be defined at any point at the (section of) curtain 50 relative to vertical line(s). The location and the shape of the stiffness control feature 60 shown in FIGS. 3A-3D are merely a demonstration. The stiffness control feature 60 can be disposed inside or outside the curtain 50 or as characteristic(s) of the curtain 50 itself, the details of which will be described later. As shown in FIG. 3A, the vertical line L (L1) overlaps with the reference line $L_{Ref}$ of the curtain 50, before the curtain 50 contacts the crop material 90. The reference line $L_{Ref}$ may be drawn in the middle part of the curtain for showing the extent (e.g. the bend angle θ) the curtain 50 bends. The curtain 50 is hung vertically relative to a ground surface before the curtain 50 engages the crop material 90 and exhibits the bend angle θ substantially equal to zero.

With reference to FIG. 3B, when the curtain 50 as a whole is rearward, the bend angle θ between the vertical line L1 and the reference line $L_{Ref}$ increases from zero to the bend angle θ1. The intersection P1 of the vertical line L1 and the reference line $L_{Ref}$ is at the top of the curtain 50.

With reference to FIG. 3C, when an upper portion 512 of the curtain 50 remains in the same position but a lower portion 514 of the curtain 50 is rearward, the bend angle θ between a vertical line L2 and the reference line $L_{Ref}$ increases from zero to the bend angle θ2. The intersection P2 of the vertical line L2 and the reference line $L_{Ref}$ is at the bottom of the upper portion 512 or the top of the lower portion 514 of the curtain 50.

With reference to FIG. 3D, when the upper portion 512 of the curtain 50 and a lower portion 514 of the curtain 50 are rearward in different extents, one bend angle θ between a vertical line L3 and the reference line $L_{Ref}$ increases from zero to the bend angle θ3, and another bend angle θ between a vertical line L4 and the reference line $L_{Ref}$ increases from zero to the bend angle θ 4. The intersection P3 of the vertical line L3 and the reference line $L_{Ref}$ is at the top of the upper portion 512. The intersection P4 of the vertical line L4 and the reference line $L_{Ref}$ is at the bottom of the upper portion 512 or the top of the lower portion 514 of the curtain 50. The number of the vertical lines and intersections can be more than two, up to infinite, such as, for example, when the curtain 50 at least partially includes a curved shape.

The configuration of the stiffness control feature 60 shown in FIGS. 3A-3D is not limited to what it is shown. For example, the stiffness control feature 60 may have, alone or in combination, variable thickness, variable durometer, multiple portions coupled to one another with different thickness, multiple layers, multiple layers with multiple strips, and weigh element(s).

Figure 4:
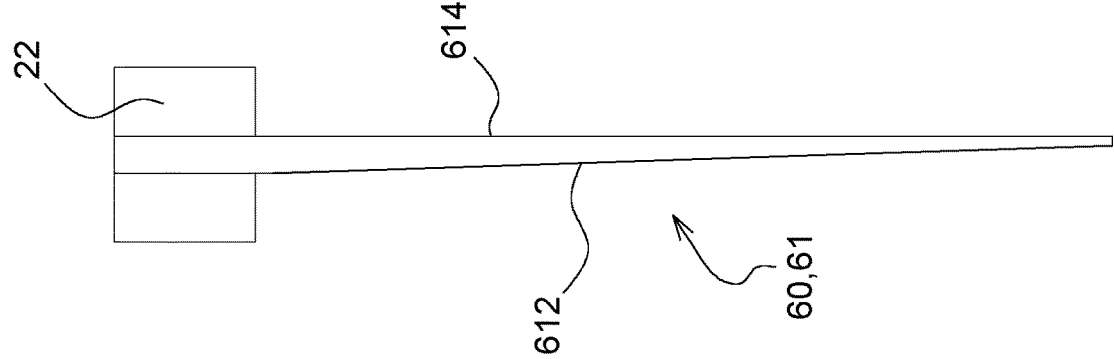
FIG. 4 is a side view of the first implementation of a stiffness control feature of a curtain having variable thickness.

FIG. 4 illustrates the first implementation of a stiffness control feature 60, 61. The stiffness control feature 61 includes a thickness of the curtain 50, and the thickness of the curtain 50 is variable in a vertical direction. The thickness of the curtain 50 increases from a bottom of the curtain 50 to a top of the curtain 50, proportionally in this implementation, so as to form a slope on a forward surface 612 operable to engage the crop material 90. The rearward surface 614, the opposite surface of the forward surface 612, may be vertical to the ground surface.

Figure 5:
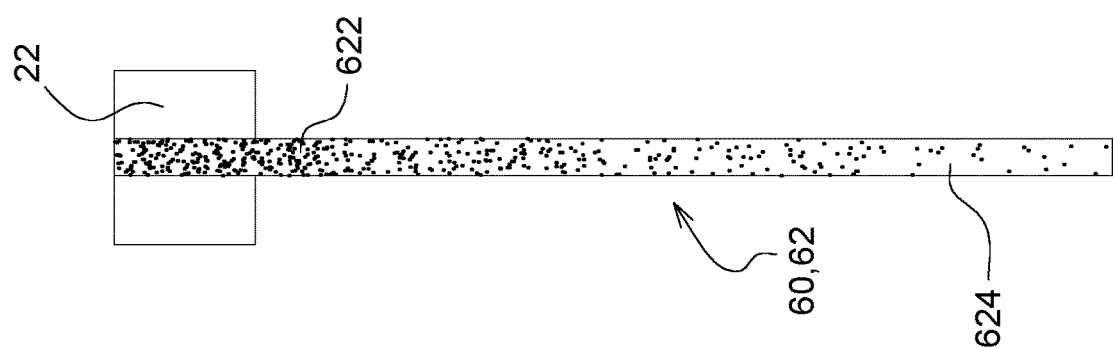
FIG. 5 is a side view of the second implementation of a stiffness control feature of a curtain having variable durometer.

Referring to FIG. 5 illustrates the second implementation of a stiffness control feature 60, 62. The stiffness control feature 62 of the curtain 50 has variable durometer, the higher portion of the curtain 50, the greater of durometer. Therefore, the stiffness control feature 62 is operable to increase the vertical stiffness of the curtain 50 from a bottom of the curtain 50 to a top of the curtain 50.

Figure 6:
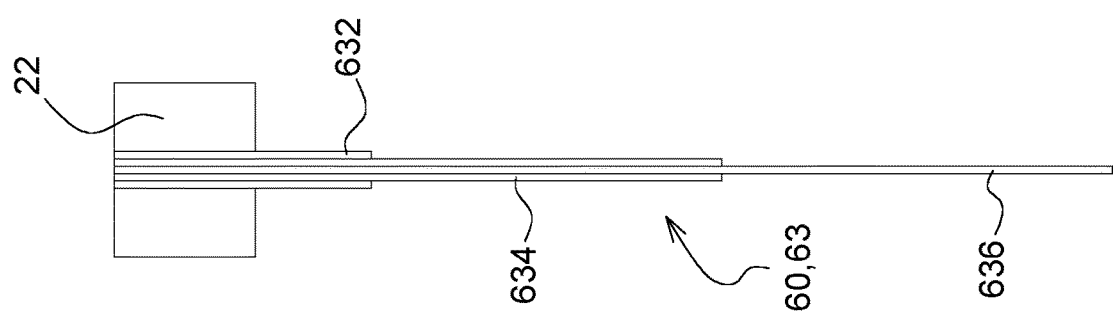
FIG. 6 is a side view of the third implementation of a stiffness control feature of a curtain having multiple portions coupled to one another with different thickness.

Referring to FIG. 6 illustrates the third implementation of a stiffness control feature 60, 63 of the curtain 50 having multiple portions coupled to one another with different thickness. The stiffness control feature 63 of curtain 50 includes a first portion 632, a second portion 634 coupled to a lower part of the first portion 632, and a third portion 636 coupled to a lower part of the second portion 634. The curtain 50 may be made by one-piece (not shown), with a thickness of the first portion 632 is greater than a thickness of the second portion 634, and the thickness of the second portion 634 is greater than a thickness of the third portion 636. Alternatively, the stiffness control feature 63 may include multiple layers with different height stacking together to form the first portion 632, second portion 634, and the third portion 636.

Figure 7:
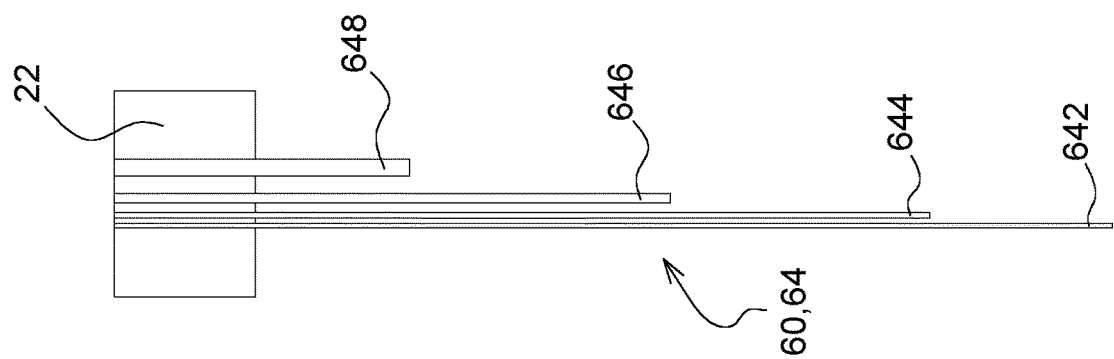
FIG. 7 is a side view of the fourth implementation of a stiffness control feature of a curtain having multiple layers.

Referring to FIG. 7 illustrates the fourth implementation of a stiffness control feature 60, 64 of the curtain 50 having multiple layers. The number of the layers in the fourth implementation is four but it may be any number of layers. The stiffness control feature 64 includes a first layer 642, a second layer 644 disposed rearward of the first layer 642 relative to the direction of operation V, a third layer 646 disposed rearward of the second layer 644 relative to the direction of operation V, and a fourth layer 648 disposed rearward of the third layer 646 relative to the direction of operation V. The first, second, third, fourth layers 642, 644, 646, 648 are operable to increase the vertical stiffness of the curtain 50 when the curtain 50 is in response to the first layer 642 moving in the rearward direction and engaging the second layer 644, the second layer 644 moving in the rearward direction and engaging the third layer 646, the third layer 646 moving in the rearward direction and engaging the fourth layer 648, with an increase of the bend angle θ. The heights of the multiple layers (the first, second, third, fourth layers 642, 644, 646, 648 as shown in FIG. 7) may be different. In one implementation, the heights of the layers may decrease from the first layer 642 to the fourth layers 648. For instance, the height of the first layer 642 is longer than a height of the second layer 644. The rearward layers such as the third layer 646 and the fourth layer 648 will only bend when the curtain 50 leans high crop material (usually stiffer than short crop material) forward. The thickness of the multiple layers (the first, second, third, fourth layers 642, 644, 646, 648 as shown in FIG. 7) may be different. In one implementation, the thickness of the layers increases from the first layer 642 to the fourth layer 648. For instance, a thickness of the second layer 644 is greater than a thickness of the first layer 642. With forward layer longer and thinner than rearward layer, such arrangement may provide more consistent vertical stiffness increase with the increasing bend angle θ, so as to provide more consistent increasing force to lean the crop material 90 forward. However the present disclosure also includes an implementation that may have forward layers shorter and/or thicker than rearward layers, or any other variation.

The distances between the layers may be different. In one implementation, the distance between layers may increase. For instance, a distance between the second layer 644 and the third layer 646 is greater than a distance between the first layer 642 and the second layer 644. In that arrangement, the time the first layer 642 gets influenced by the second layer 644 is shorter than the time the first layer 642 and second layer 644 get influenced by the third layer 646, and the stiffness of the curtain 50 changes in different extent during the course of bending partially determined by the distance between layers. Spacing the multiple layers (the first, second, third, fourth layers 642, 644, 646, 648 as shown in FIG. 7) apart could also influence their vertical stiffness. It is noted that when the multiple layers closer together the stiffer they are. The operator may change the distances between any two of the adjacent layers depending on the needs.

Figure 8A:
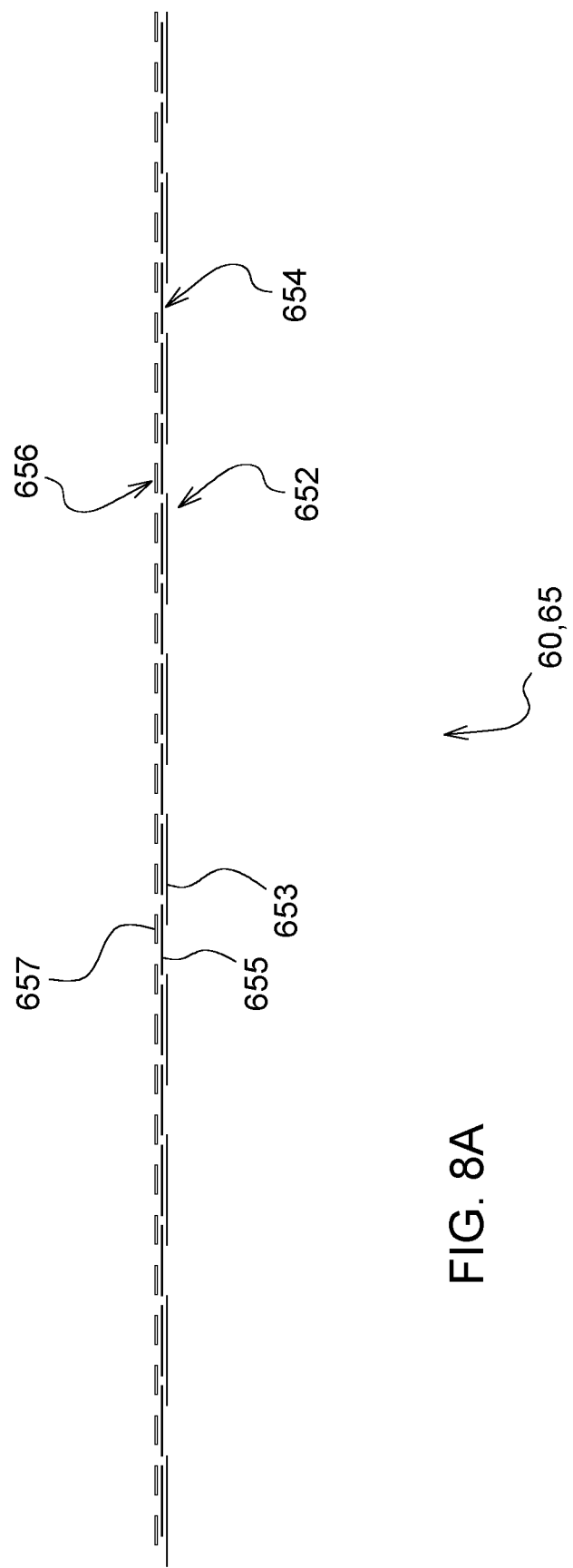
FIG. 8A is a top view of the fifth implementation of a stiffness control feature of a curtain having multiple layers, each of which include multiple strips.
Figure 8B:
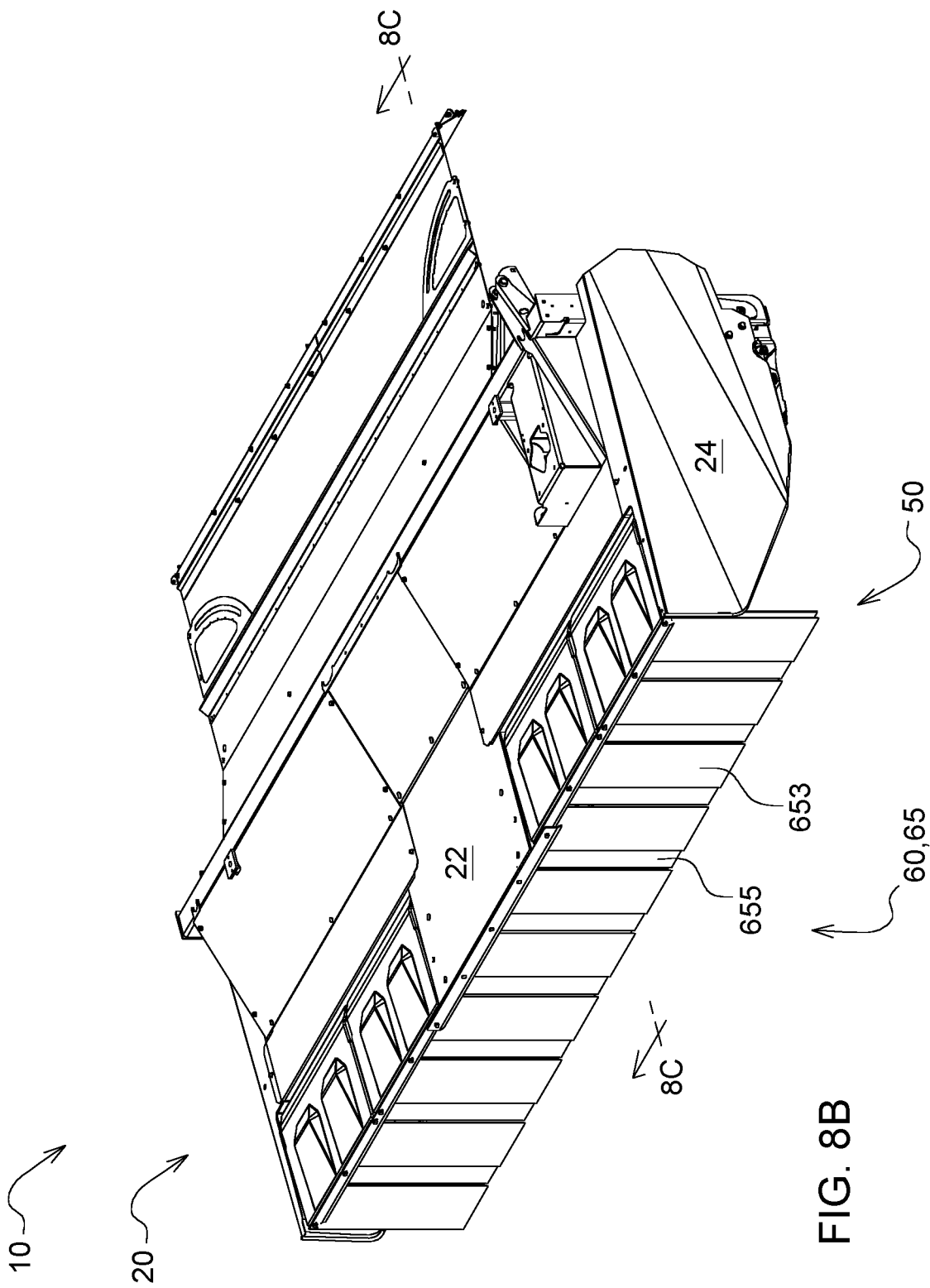
FIG. 8B is a schematic perspective view of a cutter implement having the curtain with the stiffness control feature shown in FIG. 8A.
Figure 8C:
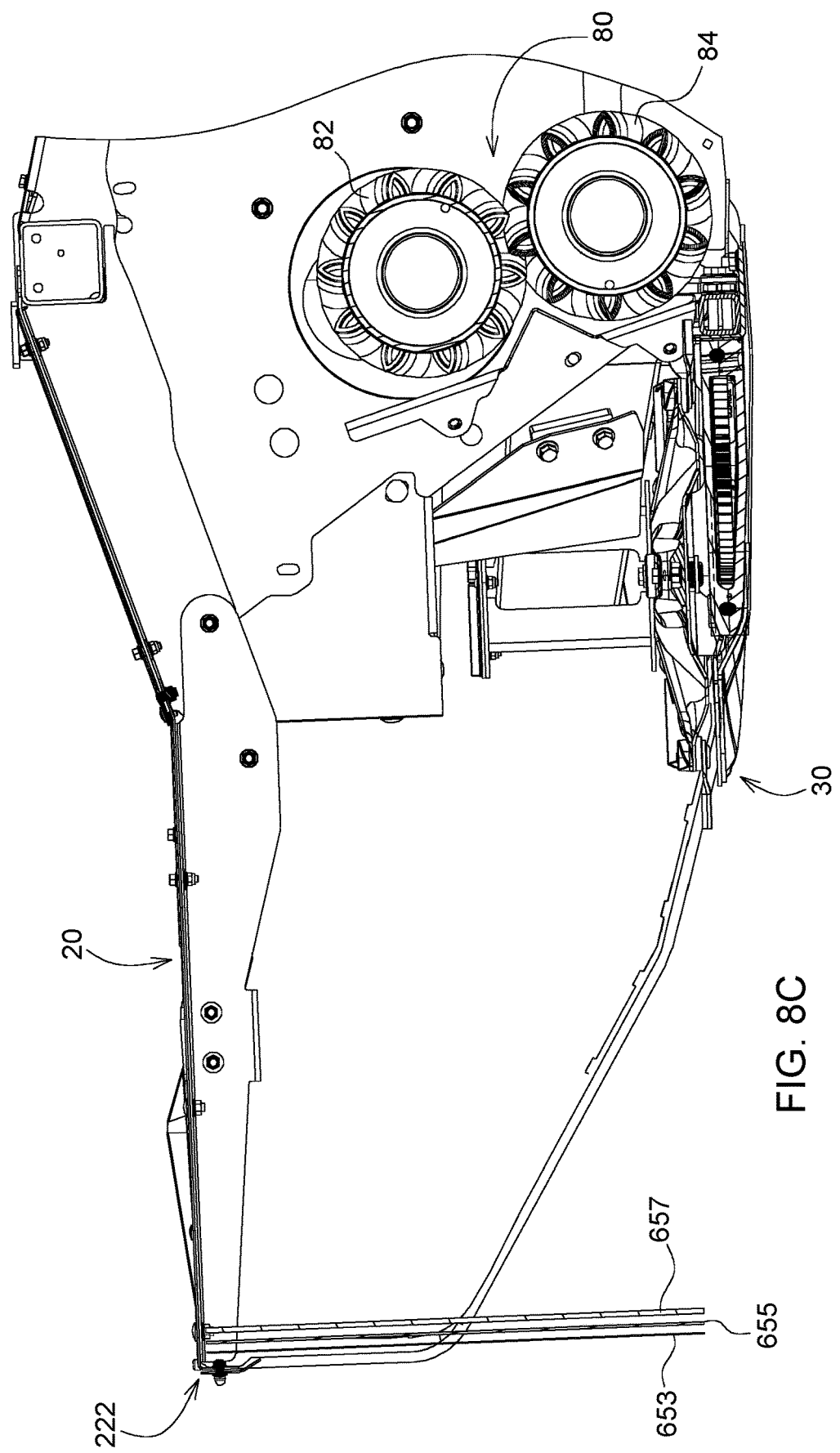
FIG. 8C is a partial schematic side view of the cutter implement shown in FIG. 8A.
Figure 8D:
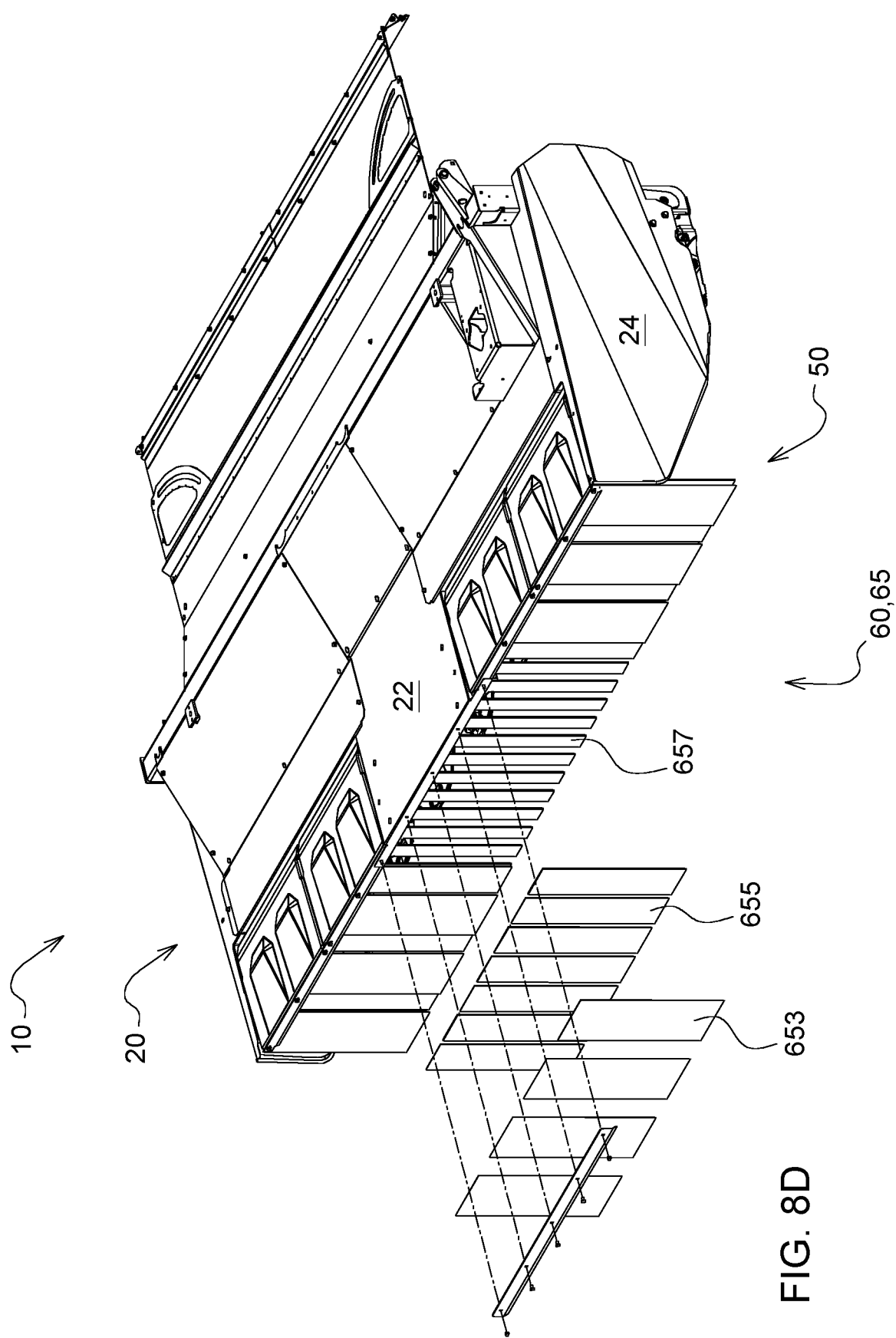
FIG. 8D is a partial exploded perspective view of the cutter implement shown in FIG. 8A.

FIGS. 8A-8D illustrates the fifth implementation of a stiffness control feature 60, 65 of the curtain 50 having multiple layers, each of which include multiple strips. The number of the layers in the fifth implementation is three but it may be any other multiple number. The stiffness control feature 65 includes a first layer 652, a second layer 654 disposed rearward of the first layer 652 relative to the direction of operation V, and a third layer 656 disposed rearward of the second layer 654 relative to the direction of operation V. The first, second and third layers 652, 654, 656 may increase the vertical stiffness of the curtain 50 when the curtain 50 is in response to the first layer 652 moving in the rearward direction and engaging the second layer 654 and the second layer 654 moving in the rearward direction and engaging the third layer 656, with an increase of the bend angle θ. As shown in FIG. 8C, the thickness of the layers increase from the first layer 652 to the third layer 656. The first layer 652 includes a row of first strips 653 disposed laterally relative to a central longitudinal axis 25 of the housing 20, the second layer 654 includes a row of second strips 655 disposed laterally relative to the central longitudinal axis 25 of the housing 20, and the third layer 656 includes a row of third strips 657 disposed laterally relative to the central longitudinal axis 25 of the housing 20. Each respective one of the first strips 653 has a first width, each respective one of the second strips 655 has a second width, and each respective one of the third strips 657 has a third width. The first width is greater than the second width and the second width is greater than the third width. At least one of the second strips 655 is operable to overlap two adjacent first strips 653 so as to cover a space between the two adjacent first strips 653 in the lateral direction.

Figure 9B:
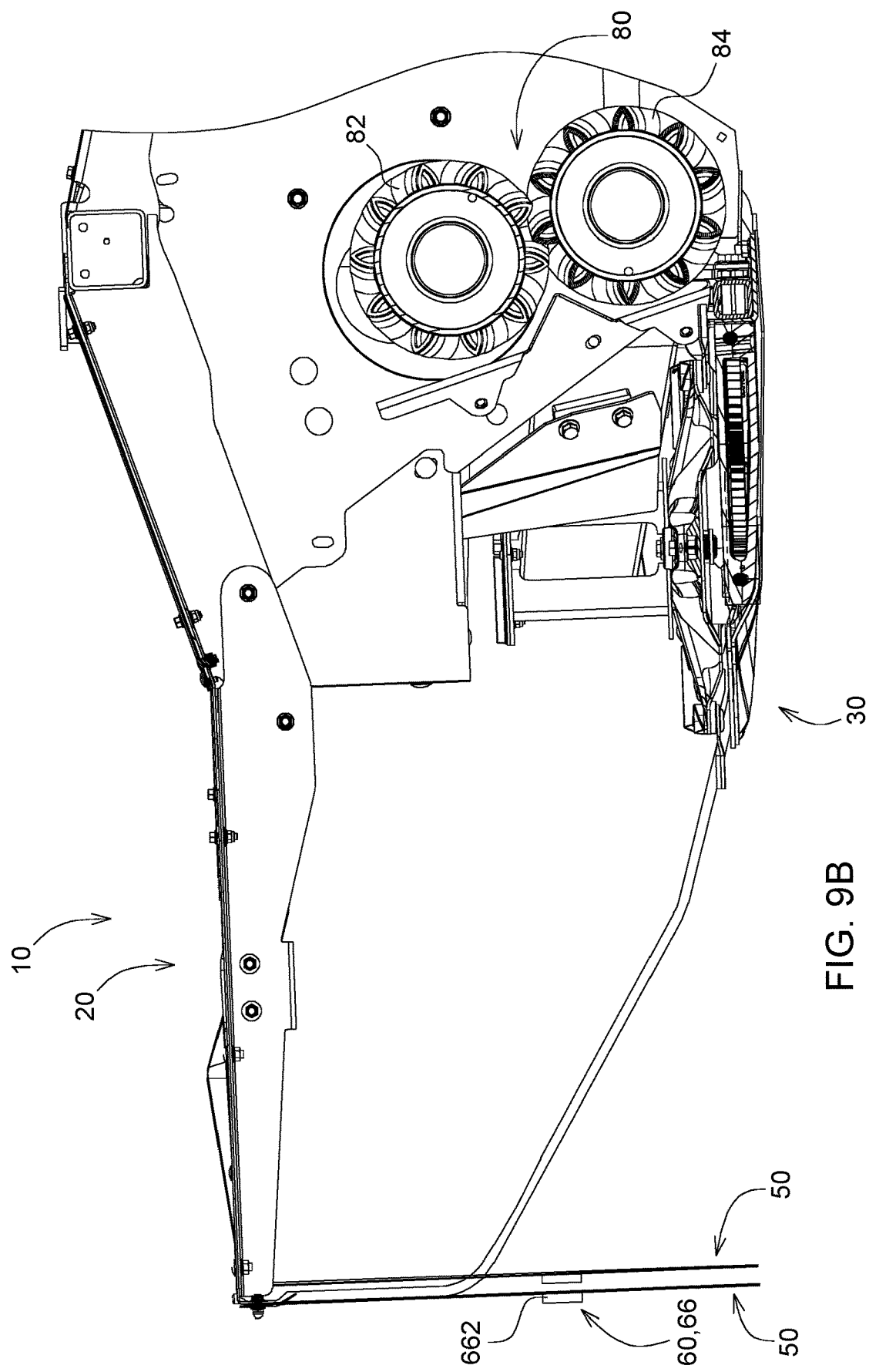
FIG. 9B is a side view of the stiffness control feature shown in FIG. 9A
Figure 9C:
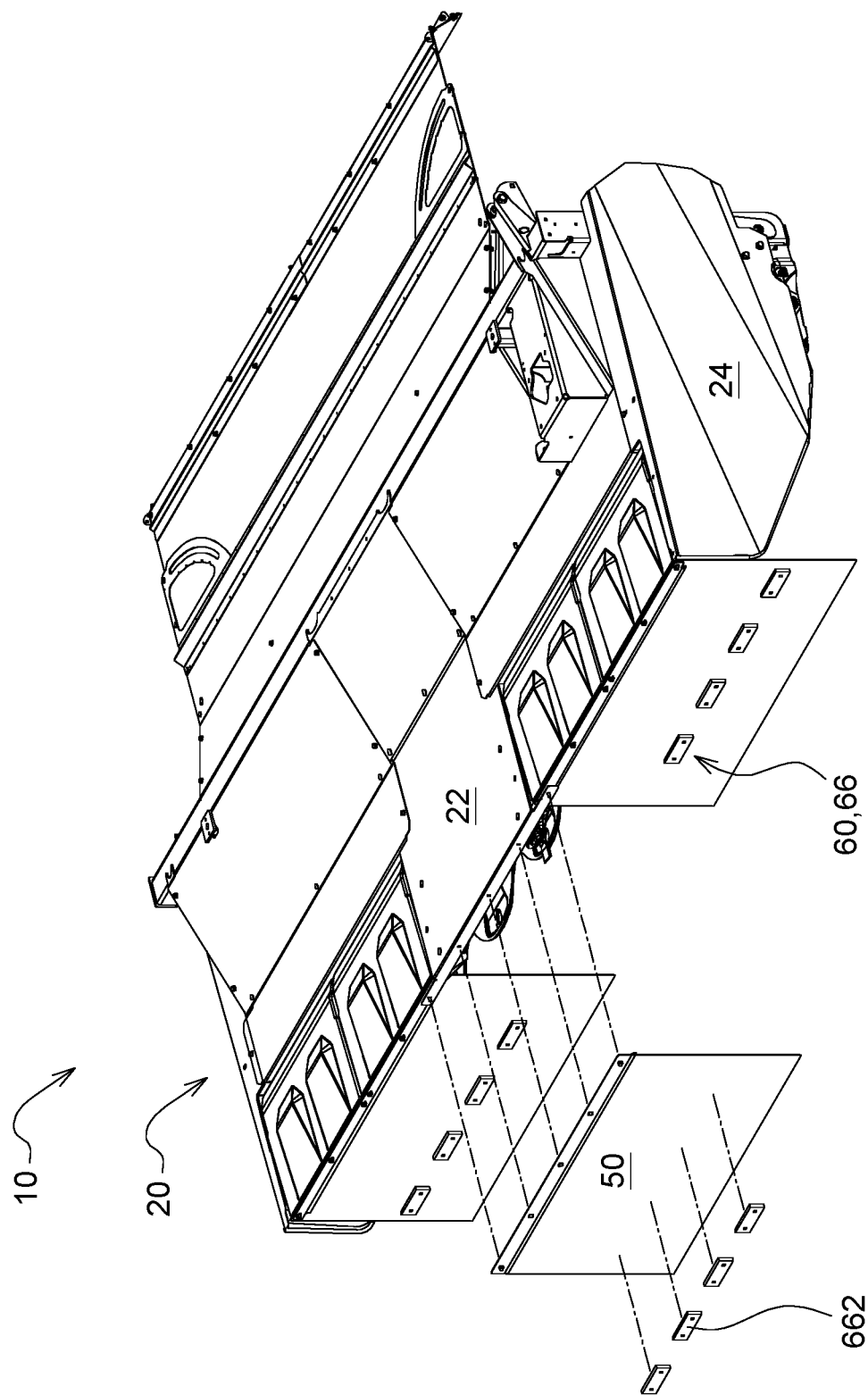
FIG. 9C is a partial exploded perspective view of the cutter implement shown in FIG. 9A.

FIGS. 9A-9C illustrates the sixth implementation of a stiffness control feature 60, 65. The stiffness control feature 60, 66 of the curtain 50 includes weight elements 662 attached to the curtain 50. As shown in FIG. 9C, the curtain 50 has three sections in this implementation and therefore an offset of the curtain in the direction of operation V is shown in FIG. 9B. The weight elements 662 are operable to at least partially change the stiffness of the curtain 50 and to increase the resistance against bending of the curtain 50 when the curtain 50 engages crop material 90. It is noted that the weight elements 662 can be arranged on the forward or rearward surface, or both. The location of the weight elements 662 can be determined depending on the needs. The weight elements 662 attach to the curtain 50 via fasteners such as screw, nuts and bolt, or adhesive agent. Changing the weight elements 662 on a segment of the curtain 50 can be performed by replacing them with another weight of weight elements 662 or replacing the section they attached to with another segment of the curtain 50 having different weight elements 662 (different from the number, weight, and locations, for example.)

Figure 10:
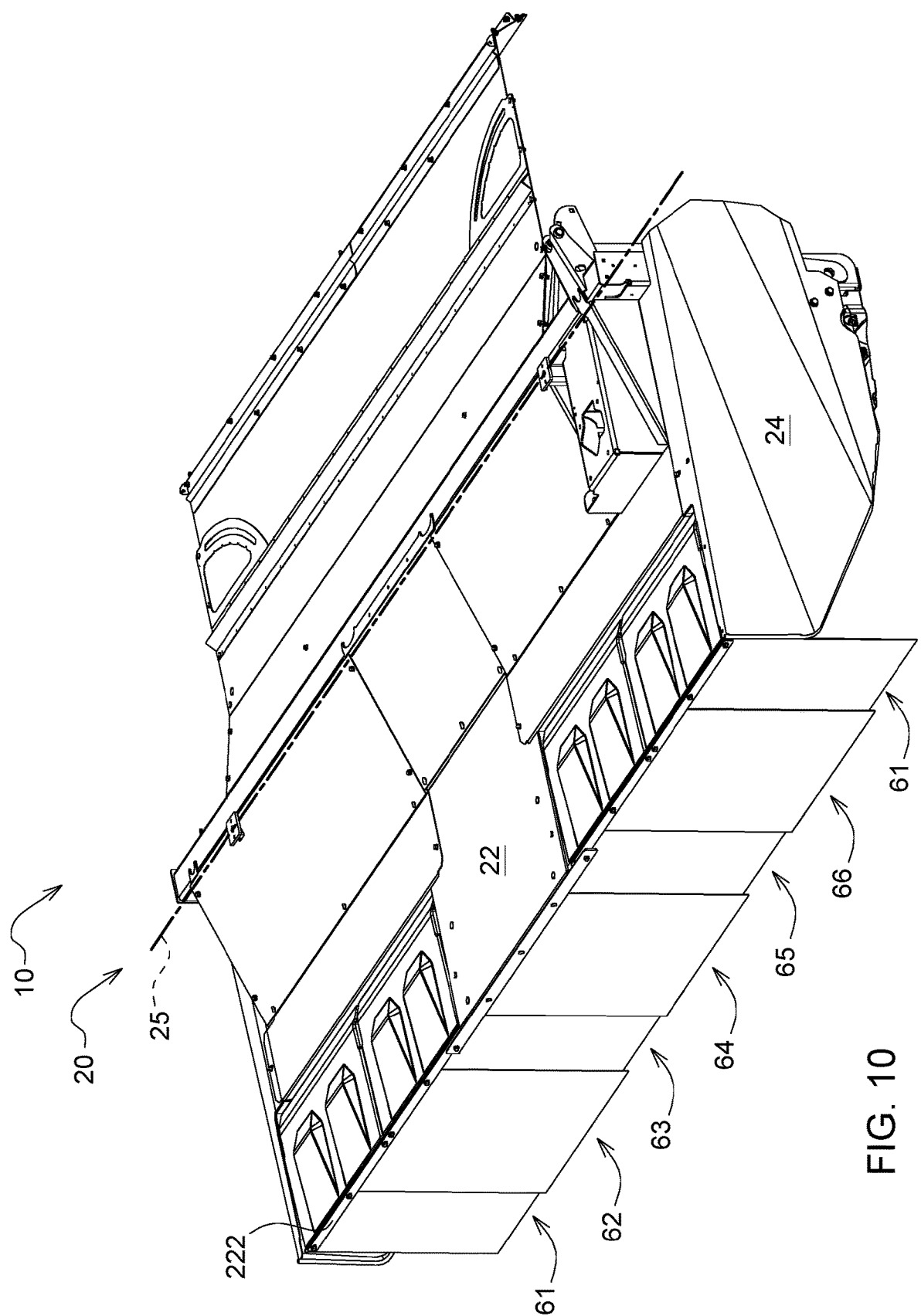
FIG. 10 is a schematic perspective view of a cutter implement having six sections with respective stiffness control features.

FIG. 10 is a schematic perspective view of a cutter implement 10 having seven sections with respective stiffness control features 61, 62, 63, 64, 65, 66. The order and number of the segments with different stiffness control features 61, 62, 63, 64, 65, 66 can be changed depending on the needs.

The present disclosure curtain apparatus having the curtain 50 for a cutter implement 10. The curtain 50 may include one or multiple sections. The curtain 50 may include one or more stiffness control feature 60 (61, 62, 63, 64, 65, 66) as described previously.

Without in any way limiting the scope, interpretation, or application of the claims appearing below, a technical effect of one or more of the example embodiments disclosed herein is to provide stiffness control feature(s) control a vertical stiffness of the curtain to change the resistance of the curtain to lean the crop material in a forward direction relative to the direction of operation, so as to obtain a better cutting or crop processing results. Another technical effect of one or more of the example embodiments disclosed herein is the aforementioned stiffness control feature(s) coupled to or included by the curtain is operable to be replaced by different stiffness control feature, or the (section of) curtain with the stiffness control feature is operable to be replaced by another (section of) curtain together with different stiffness control feature, such that the entire curtain or some sections of the curtain can adjust the resistance on the crop, leaning the crop in a preferable extent for cutting and processing the crop material.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A cutter implement for cutting crop material, the cutter implement comprising:
   a housing having a forward end for engaging the crop material when moving in a direction of operation, wherein the housing at least partially defines a cutting region disposed at the forward end thereof;
   a cutter coupled to the housing and operable to cut the crop material in the cutting region;
   a curtain coupled to the forward end of the housing and positioned forward of the cutter relative to the direction of operation for engaging and leaning the crop material upstream of the cutter, wherein the curtain includes a stiffness control feature operable to control a vertical stiffness of the curtain to provide a variable vertical stiffness that increases with an increase in a bend angle of the curtain rearward relative to the direction of operation, the stiffness control feature includes a thickness of the curtain, the thickness of the curtain is variable in a vertical direction, and the thickness of the curtain increases from a bottom of the curtain to a top of the curtain.

2. The cutter implement set forth in claim 1, wherein the thickness of the curtain increases proportionally, so as to form a slope operable to engage the crop material.

3. The cutter implement set forth in claim 1, wherein the stiffness control feature is configured to increase the vertical stiffness of the curtain from a bottom of the curtain to a top of the curtain.

4. The cutter implement set forth in claim 1, wherein the curtain is hung vertically relative to a ground surface before the curtain engages the crop material and exhibits the bend angle substantially equal to zero.

5. The cutter implement set forth in claim 1, wherein the stiffness control feature includes a first layer and a second layer disposed rearward of the first layer relative to the direction of operation and configured to increase the vertical stiffness of the curtain when the curtain is in response to the first layer moving in a rearward direction and engaging the second layer.

6. The cutter implement set forth in claim 5, wherein a height of the first layer is different from a height of the second layer.

7. A cutter implement for cutting crop material, the cutter implement comprising:
   a housing having a forward end for engaging the crop material when moving in a direction of operation, wherein the housing at least partially defines a cutting region disposed at the forward end thereof;
   a cutter coupled to the housing and operable to cut the crop material in the cutting region;
   a curtain coupled to the forward end of the housing and positioned forward of the cutter relative to the direction of operation for engaging and leaning the crop material upstream of the cutter, wherein the curtain includes a stiffness control feature operable to control a vertical stiffness of the curtain to provide a variable vertical stiffness that increases with an increase in a bend angle of the curtain rearward relative to the direction of operation, wherein the stiffness control feature includes a first layer and a second layer disposed rearward of the first layer relative to the direction of operation and configured to increase the vertical stiffness of the curtain when the curtain is in response to the first layer moving in a rearward direction and engaging the second layer, a height of the first layer is different from a height of the second layer, and a thickness of the second layer is different from a thickness of the first layer.

8. The cutter implement set forth in claim 5, wherein the first layer includes a row of first strips disposed laterally relative to a central longitudinal axis of the housing, and the second layer includes a row of second strips disposed laterally relative to the central longitudinal axis of the housing.

9. A cutter implement for cutting crop material, the cutter implement comprising:
   a housing having a forward end for engaging the crop material when moving in a direction of operation, wherein the housing at least partially defines a cutting region disposed at the forward end thereof;
   a cutter coupled to the housing and operable to cut the crop material in the cutting region;
   a curtain coupled to the forward end of the housing and positioned forward of the cutter relative to the direction of operation for engaging and leaning the crop material upstream of the cutter, wherein the curtain includes a stiffness control feature operable to control a vertical stiffness of the curtain to provide a variable vertical stiffness that increases with an increase in a bend angle of the curtain rearward relative to the direction of operation, wherein the stiffness control feature includes a first layer and a second layer disposed rearward of the first layer relative to the direction of operation and configured to increase the vertical stiffness of the curtain when the curtain is in response to the first layer moving in a rearward direction and engaging the second layer, the first layer includes a row of first strips disposed laterally relative to a central longitudinal axis of the housing, the second layer includes a row of second strips disposed laterally relative to the central longitudinal axis of the housing, the row of first strips includes a plurality of first strips, with each respective one of the plurality of first strips having a first width, and the row of second strips includes a plurality of second strips, with each respective one of the plurality of second strips having a second width, wherein the first width is greater than the second width.

10. The cutter implement set forth in claim 9, further comprising a third curtain including a row of third strips having a plurality of third strips, disposed laterally relative to the central longitudinal axis of the housing, with each respective one of the plurality of the third strips having a third width, wherein the third width is narrower than the second width.

11. The cutter implement set forth in claim 8, wherein at least one of the second strips is operable to overlap two adjacent first strips so as to cover a space between the two adjacent first strips.

12. A cutter implement for cutting crop material, the cutter implement comprising:
- a housing having a forward end for engaging the crop material when moving in a direction of operation, wherein the housing at least partially defines a cutting region disposed at the forward end thereof;
- a cutter coupled to the housing and operable to cut the crop material in the cutting region;
- a curtain coupled to the forward end of the housing and positioned forward of the cutter relative to the direction of operation for engaging and leaning the crop material upstream of the cutter, wherein the curtain includes a stiffness control feature operable to control a vertical stiffness of the curtain to provide a variable vertical stiffness that increases with an increase in a bend angle of the curtain rearward relative to the direction of operation, wherein the curtain includes a first portion and a second portion coupled to a lower part of the first portion, and a thickness of the first portion is greater than a thickness of the second portion.

13. The cutter implement set forth in claim 1, wherein the stiffness control feature includes a weight element attached to the curtain, wherein the weight element is operable to at least partially change the stiffness of the curtain and to increase a resistance against bending of the curtain when the curtain engages crop material.

14. A curtain apparatus for a cutter implement, comprising:
- a curtain operable to be coupled to the cutter implement, wherein the curtain includes a stiffness control feature operable to control a vertical stiffness of the curtain to provide a variable vertical stiffness that increases with an increase in a bend angle of the curtain rearward relative to a direction of operation, the stiffness control feature includes a thickness of the curtain, the thickness of the curtain is variable in a vertical direction, and the thickness of the curtain increases from a bottom of the curtain to a top of the curtain.

15. The curtain apparatus set forth in claim 14, wherein the stiffness control feature includes a first layer and a second layer disposed rearward of the first layer relative to the direction of operation and configured to increase the vertical stiffness of the curtain when the curtain is in response to the first layer moving in the rearward direction and engaging the second layer.

16. The curtain apparatus set forth in claim 15, wherein the first layer includes a row of first strips disposed laterally across a width of the first layer, and the second layer includes a row of second strips disposed laterally across a width of the second layer.

17. The curtain apparatus set forth in claim 14, wherein the stiffness control feature includes a weight element attached to the curtain, wherein the weight element is operable to at least partially change the stiffness of the curtain and to increase a resistance against bending of the curtain when the curtain engages the crop material.

* * * * *